US012798342B2

(12) United States Patent
Kwon et al.

(10) Patent No.: US 12,798,342 B2
(45) Date of Patent: Nov. 17, 2026

(54) SUNROOF BRACKET FOR VEHICLE

(71) Applicant: DAEHAN SOLUTION CO., LTD, Incheon (KR)

(72) Inventors: Choong Ho Kwon, Seoul (KR); Hang Sik Choi, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 274 days.

(21) Appl. No.: 18/645,709

(22) Filed: Apr. 25, 2024

(65) Prior Publication Data

US 2024/0359539 A1 Oct. 31, 2024

(30) Foreign Application Priority Data

Apr. 28, 2023 (KR) ........................ 10-2023-0055882

(51) Int. Cl.
*B60J 7/043* (2006.01)

(52) U.S. Cl.
CPC .................................... *B60J 7/043* (2013.01)

(58) Field of Classification Search
CPC ........................................................ B60J 7/043
USPC .......................................................... 296/210
See application file for complete search history.

(56) References Cited

U.S. PATENT DOCUMENTS

| | | | | |
|---|---|---|---|---|
| 5,149,170 A * | 9/1992 | Matsubara | B60J 7/003 | 296/213 |
| 8,764,891 B1 * | 7/2014 | Brown | B60R 13/0231 | 96/214 |
| 2001/0026084 A1 * | 10/2001 | Bienert | B60J 7/003 | 296/214 |
| 2014/0265456 A1 * | 9/2014 | Huelke | B60R 13/0231 | 296/214 |
| 2020/0377039 A1 * | 12/2020 | Engelhardt | B60R 13/0206 | |
| 2021/0394688 A1 * | 12/2021 | Mailänder | B60R 13/0231 | |

FOREIGN PATENT DOCUMENTS

| | | |
|---|---|---|
| CN | 210706834 * | 6/2020 |
| KR | 101870734 B1 * | 6/2018 |
| KR | 102331391 B1 * | 12/2021 |

* cited by examiner

*Primary Examiner* — Muhammad Shafi
(74) *Attorney, Agent, or Firm* — Dickinson Wright PLLC

(57) ABSTRACT

By forming hooks on a sunroof bracket to allow a headliner portion wrapping an opening to be fixedly caught thereon, it is possible to prevent a portion subjected to a wrapping process from being easily peeled or detached, thereby improving the quality of the headliner. In particular, by forming the hooks one-to-one on at least corner portions of the opening to allow portions on which it is difficult to perform the wrapping process due to the occurrence of overlapping when the wrapping process is performed and which are easily peeled or separated even after the process to be caught thereon, it is possible to further improve the quality of the headliner.

2 Claims, 10 Drawing Sheets

SUNROOF BRACKET FOR VEHICLE

CROSS-REFERENCE TO RELATED APPLICATION

This application claims priority to and the benefit of Korean Patent Application No. 10-2023-0055882, filed on Apr. 28, 2023, the disclosure of which is incorporated herein by reference in its entirety.

BACKGROUND

1. Field of the Invention

The present invention relates to a sunroof bracket for a vehicle, and more specifically, to a sunroof bracket for a vehicle on which hooks, on which fabric between a base and the fabric that constitute a headliner is to be caught, are formed, and thus it is possible to prevent the occurrence of peeling or wrinkles when an opening is covered, thereby improving the quality of the headliner. In this case, since the hooks allow portions wrapping at least corner portions of the opening to be fixedly caught thereon, it is possible to improve the appearance of a portion where the most peeling and wrinkles are generated, omit a pad attaching process separately used for finishing the portion, and thus reduce manufacturing costs.

2. Discussion of Related Art

In general, a headliner, which is an interior material mounted to face a roof panel in a vehicle interior, is subjected to a wrapping process to finish edge portions thereof. The wrapping process improves the aesthetic sense and appearance of the headliner by wrapping the edge portions of the headliner using fabric constituting the headliner.

In Patent Documents 1 to 3 below, headliner wrapping technologies are disclosed.

(Patent Document 1) Korean Patent No. 10-1870734

When edge portions of a surface layer on which a base of a headliner is placed are wrapped by being pulled by a pulling block, the edge portions are fixed to the pulling block. Therefore, as the pulling block pulls the surface layer, the edge portions of the surface layer are pulled more strongly, and thus it is possible to prevent the occurrence of wrinkles on the surface layer, thereby improving the quality of the headliner. In particular, since hooking protrusions are formed on the pulling block that pulls at least portions that are not linear sections of the corner portions of the surface layer, for example, a pillar A portion, corner portions of an opening, a shape portion of a quarter glass, and the like, and the corresponding edge portions are fixedly fitted onto the hooking protrusions to be pulled by the pulling block, it is possible to eliminate the wrinkle phenomenon occurring at the edge portions on which wrinkles may occur when the corner portions are not strongly pulled.

(Patent Document 2) Korean Patent No. 10-2331391

Patent Document 2 relates to an automatic wrapping device for manufacturing a headliner for a vehicle, which includes a frame including vertical frames that are movable using wheels provided on lower surfaces thereof and disposed at vertices of a quadrangle, and bottom, upper, lower, and ceiling frames installed to connect the vertical frames at bottoms, lower sides, upper sides, and ceiling sides of the vertical frames, a table installed on the lower frame, a folding device installed on the table, a base jig disposed at a central portion of the table, skin members each having an opening therein and disposed on the base jig to match a shape of the base jig and a base having an opening therein and disposed to be stacked on the skin member, a heating device driven to be vertically moved by a rod of a cylinder installed on the ceiling frame to form a headliner finished by heating and compressing each of at least portions adjacent to front and rear outer edges among portions adjacent to outer edges of the skin member and the base and portions adjacent to the openings of the skin member and the base, and a clamping device for clamping or unclamping the base and the skin member after the base and the skin member are positioned above the base jig or disposed on the base jig by being vertically moved by the rod of the cylinder installed at front and rear sides of the ceiling frame, wherein the skin member has side end portions further extending outward compared to side end portions of the base, and the folding device wraps and presses the base so that the skin member is bonded in close contact with the base by being spread without wrinkles on at least portions adjacent to the front outer edges and the portions adjacent to the rear outer edges among the portions adjacent to the outer edges of the base and the skin member.

(Patent Document 3) Korean Patent No. 10-1405540

Patent Document 3 relates to a vehicle headliner automatic wrapping device including a cover unit, a seating clamp that vertically moves outside the cover unit and fixes a headliner, a pre-heater that vertically moves inside the seating clamp and increases a temperature of the headliner, and a linear block and a corner block that are disposed inside the cover unit and connected to the cover unit.

Meanwhile, as described above, the wrapping process of wrapping the edge portions of the headliner (H) is also performed on the edge portions of the opening (O) required for sunroof installation when the sunroof is mounted on the vehicle as shown in FIGS. 1 to 4.

RELATED ART DOCUMENTS

Patent Documents (Patent Document 1) Korean Patent No. 10-1870734 (registered date: Jun. 19, 2018)

(Patent Document 2) Korean Patent No. 10-2331391 (registered date: Nov. 23, 2021)

(Patent Document 3) Korean Patent No. 10-1405540 (registered date: Jun. 2, 2014)

SUMMARY OF THE INVENTION

However, the following problems are occurred in the technology of wrapping the corner portions of the opening formed for sunroof installation in the headliner applied to the vehicle with the sunroof as described above.

(1) The fabric or the like exposed at the vehicle interior wraps the inner surface of the opening and the edge portions of the headliner facing the roof panel and is attached to the sunroof bracket mounted on the headliner in advance for sunroof installation.

(2) Therefore, since the attaching process is performed between different materials, there is a quality degradation problem that the fabric or the like is easily peeled or separated from the sunroof bracket, thereby spoiling the appearance of the headliner.

(3) In particular, since the opening is often formed in a quadrangular shape, when the wrapping process is performed on corner portions of the quadrangle, overlapping portions occur, and thus it is difficult to perform the wrapping process and the fabric or the like is easily peeled as marked by a red circle in FIG. 4 even when the wrapping process is performed, thereby spoiling the appearance of the headliner.

(4) To solve the problems, as shown in FIG. 4, a pad is additionally attached to a portion that is expected to be easily peeled. This causes the addition of unnecessary process and an increase in manufacturing costs caused by adding the pad.

The present invention is directed to providing a sunroof bracket for a vehicle, in which a plurality of hooks are formed on the sunroof bracket mounted on a headliner of the vehicle with a sunroof to allow a headliner portion wrapping an opening formed in the headliner portion for sunroof installation to be fixedly caught thereon, and thus it is possible to easily and conveniently perform a wrapping process and prevent portions subjected to the wrapping process from being easily peeled or detached so that the quality of the headliner can be improved.

In particular, the present invention is also directed to providing a sunroof bracket for a vehicle, in which hooks are formed one-to-one on at least corner portions of an opening to allow portions in which it is difficult to perform the wrapping process due to overlapping portions occurring when the wrapping process is performed and which are easily peeled or separated even after the process to be fixedly caught thereon, and thus it is possible to further improve the quality of the headliner.

In addition, the present invention is also directed to providing a sunroof bracket for a vehicle, in which hooks are formed by cutting a surface of the sunroof bracket in a “C” shape and then bending the cut portion twice in directions opposite to each other when the hooks are formed, and thus it is possible to allow the headliner to be easily caught on the hooks when the wrapping process is performed and prevent the portion to be caught from being easily torn.

A sunroof bracket for a vehicle according to the present invention includes a bracket body (100) installed at an edge of an opening (O) formed in a headliner (H) for sunroof installation, wherein a plurality of hooks (110), which are folded at corner portions of the opening (O) to allow fabric between a base and the fabric of the headliner (H) wrapping a surface of the bracket body (100) to be fixedly caught thereon, are formed on the surface of the bracket body (100) facing a roof panel when the bracket body (100) is mounted on the headliner (H).

In particular, the hook (110) may be formed by cutting the surface of the bracket body (100) in a “C” shape and bending a cut portion twice in directions opposite to each other.

In addition, the hooks (110) may be formed one-to-one on at least corner portions of the surface of the bracket body (100).

BRIEF DESCRIPTION OF THE DRAWINGS

A set of FIG. 3A and FIG. 3B is an enlarged cutout view of an opening formed in a headliner for sunroof installation, in which FIG. 3B is an enlarged cross-sectional view along line A-A in FIG. 3A.

A set of FIG. 5A and FIG. 5B is an enlarged cutout view of an opening of a headliner to which a sunroof bracket for a vehicle according to the present invention is applied, in which FIG. 5B is an enlarged cross-sectional view of portion “B” in FIG. 5A.

A set of FIG. 7A

DETAILED DESCRIPTION OF EXEMPLARY EMBODIMENTS

Figure 1:
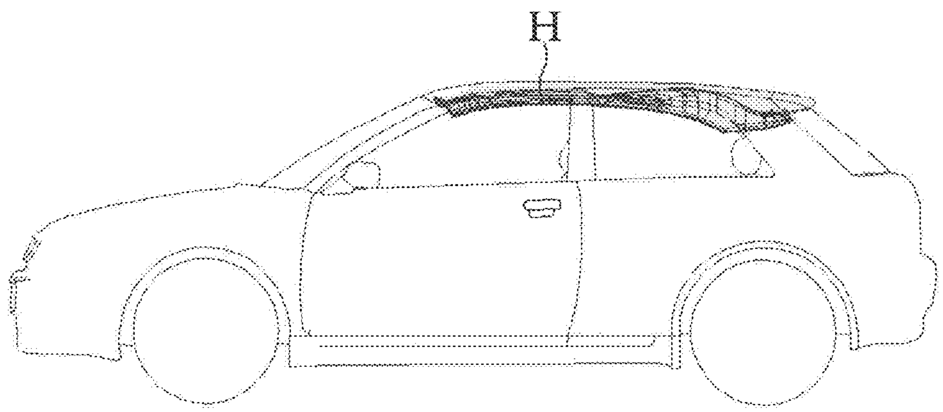
FIG. 1(PRIOR ART)
FIG. 1 is a side view of a vehicle provided with a sunroof in which a conventional headliner is mounted.
Figure 2:
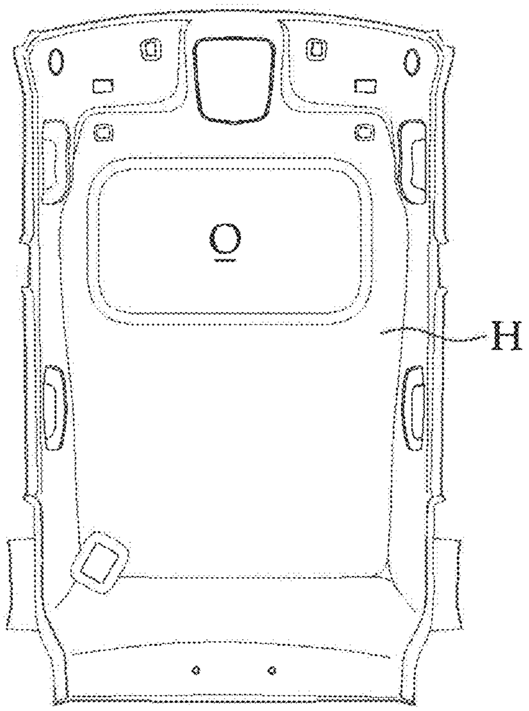
FIG. 2(PRIOR ART)
FIG. 2 is a plan view showing a headliner used in a vehicle in which a conventional sunroof is mounted.
Figure 3A:
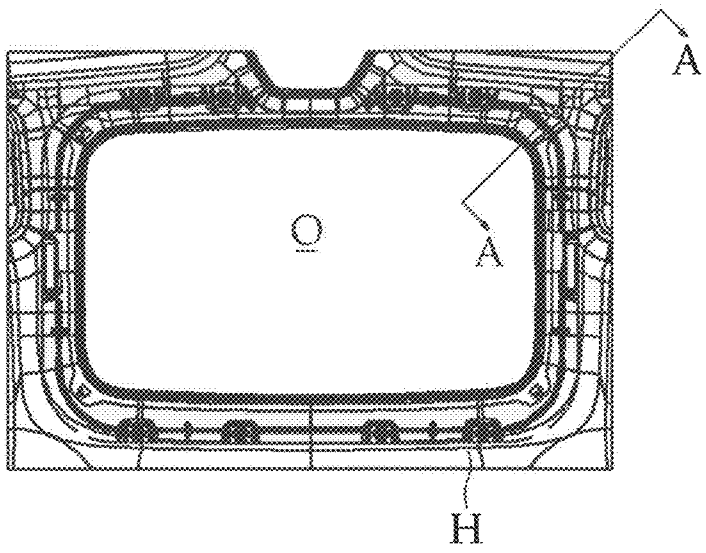
FIG. 3A(PRIOR ART)
FIG. 3A is a plan view.
Figure 3B:
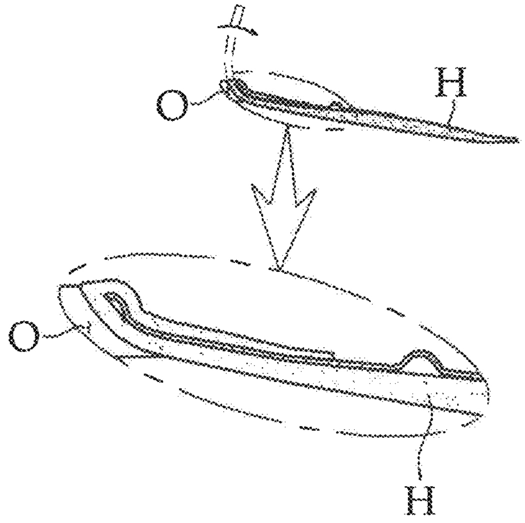
FIG. 3B(PRIOR ART)
Figure 4:
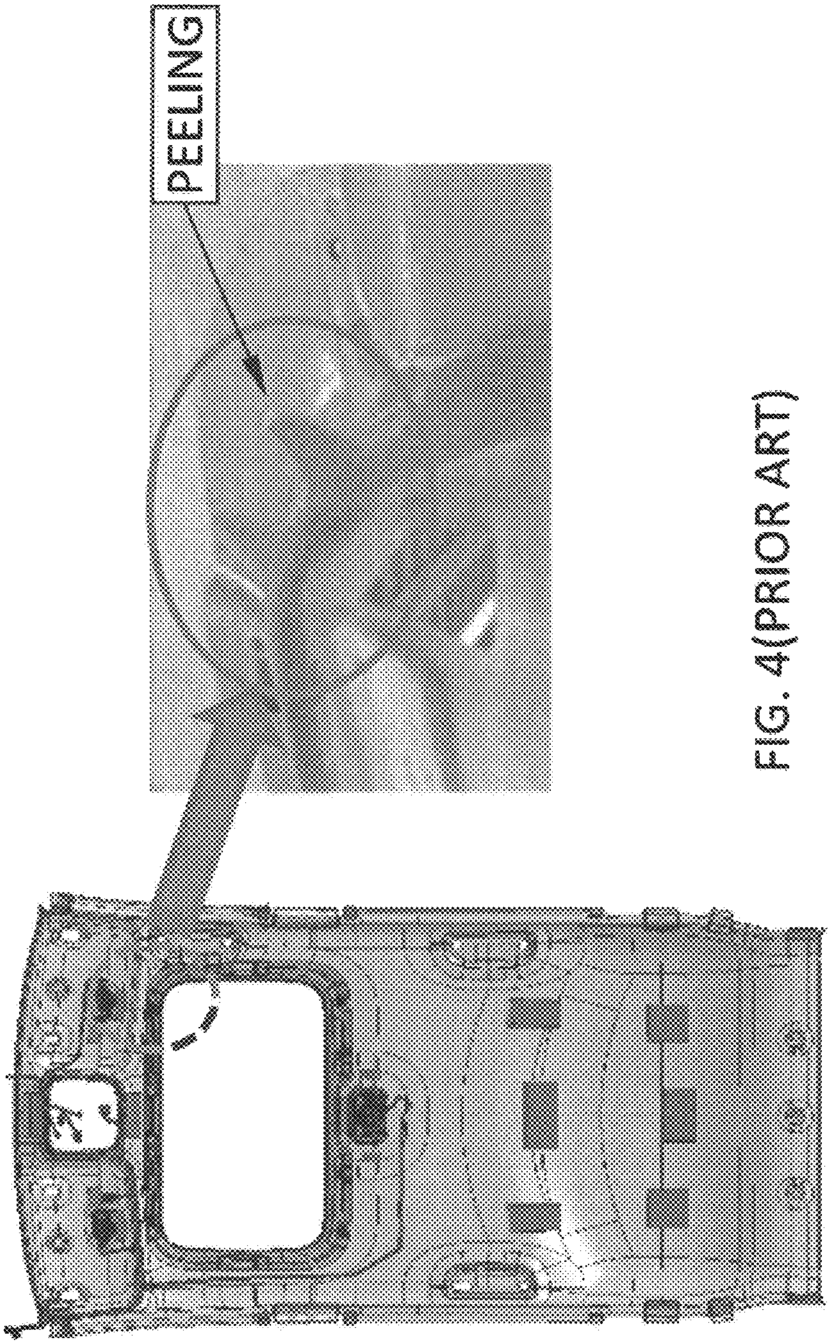
FIG. 4(PRIOR ART)
FIG. 4 is a picture showing a phenomenon that a fabric portion is lifted from a conventional opening after a wrapping process.

Hereinafter, exemplary embodiments according to the present invention will be described in detail with reference to the accompanying drawings. Prior to the description, terms or words used in the specification and claims should not be construed as being limited to their usual or dictionary meanings and should be construed as meaning and concept consistent with the technical spirit of the present invention according to a principle in which the inventors can appropriately define the concept of the terms in order to describe their inventions in the best method.

Therefore, since the embodiments described in the specification and the configurations illustrated in the drawings are only the most exemplary embodiment of the present invention and do not represent all of the technical spirit of the present invention, it should be understood that various equivalents and modified examples capable of replacing the embodiments and the configurations may be present at the time of this application.

[Configuration of Sunroof Bracket for a Vehicle]

Figure 5A:
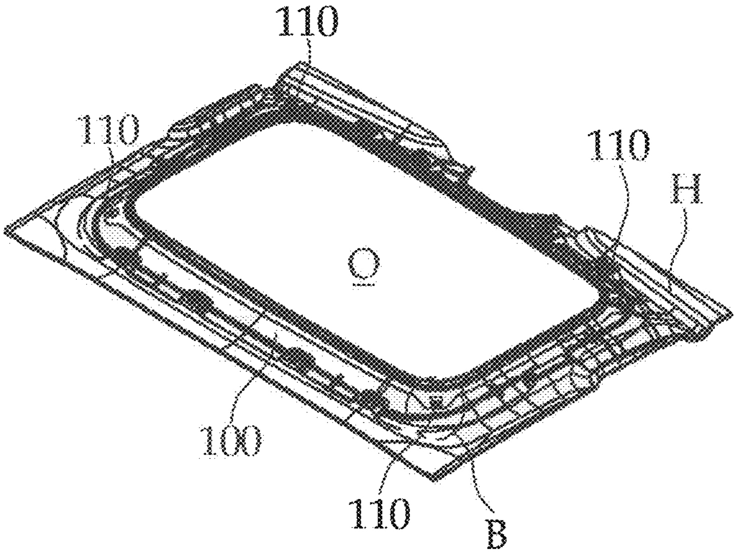
FIG. 5A is a perspective view.
Figure 5B:
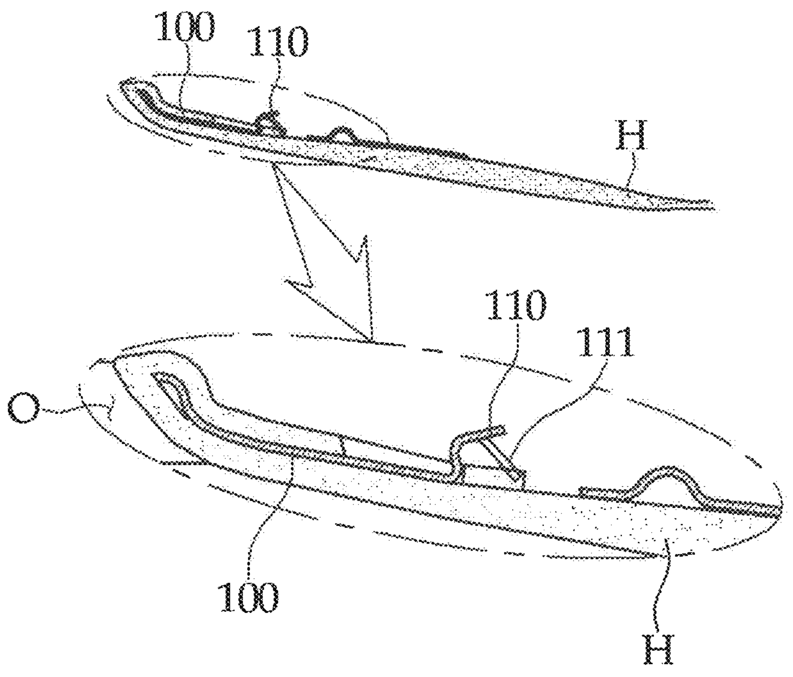
Figure 6:
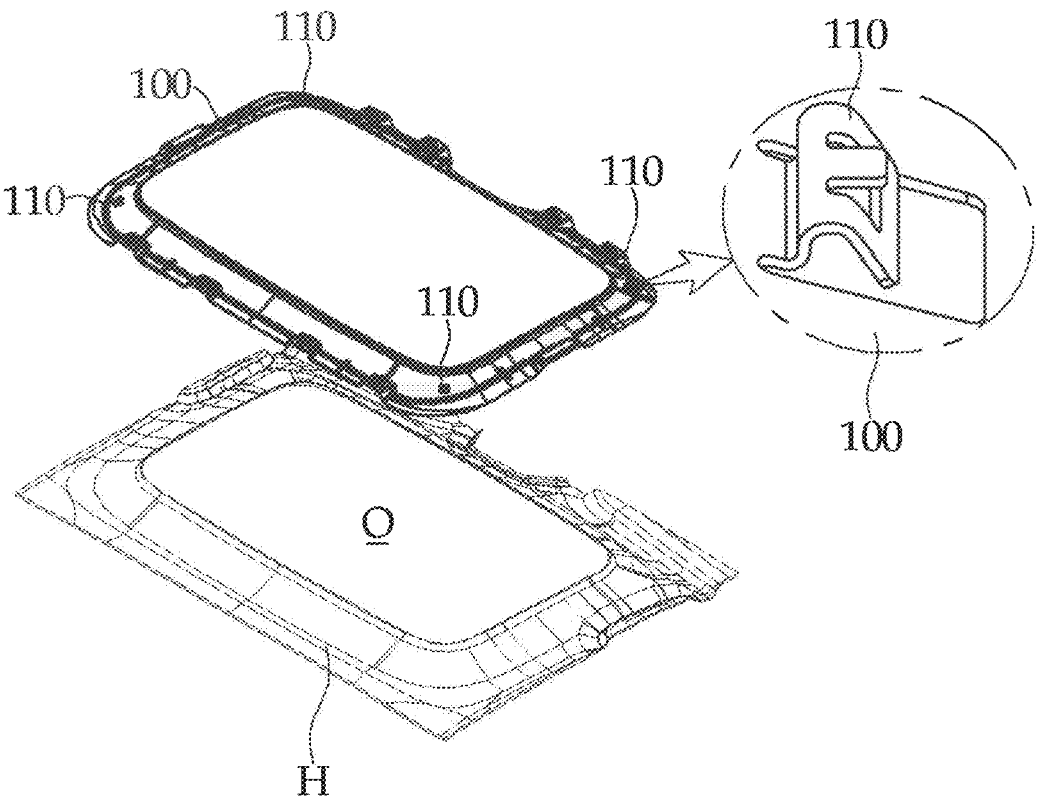
FIG. 6 is a perspective view showing a state in which the sunroof bracket according to the present invention is separated from the opening.
Figure 7A:
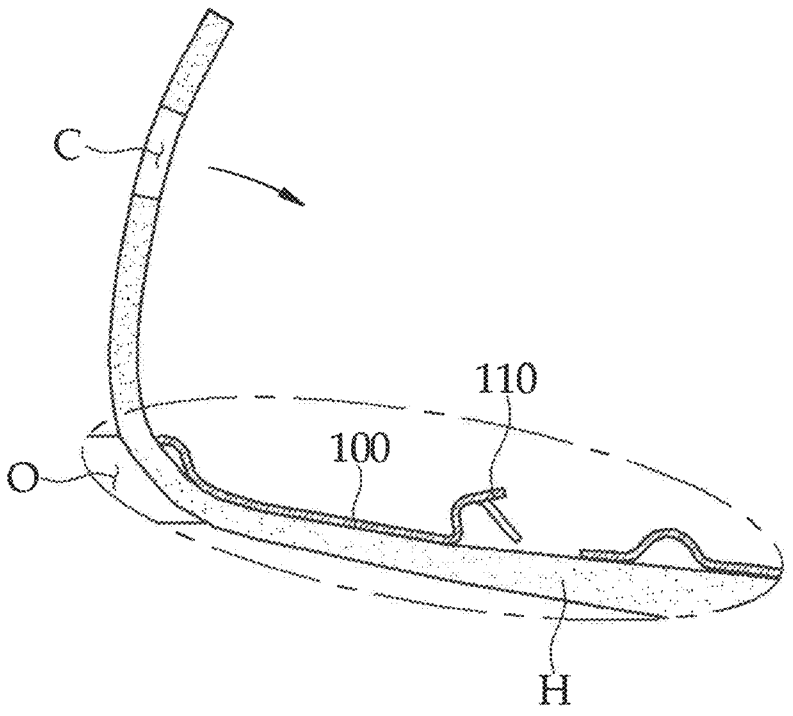
FIG. 7B shows cross-sectional views showing states before (see FIG. 7A) and after (see FIG. 7B) the sunroof bracket according to the present invention is mounted in the opening and then the headliner is caught on the hooks while the wrapping process is performed.
Figure 7B:
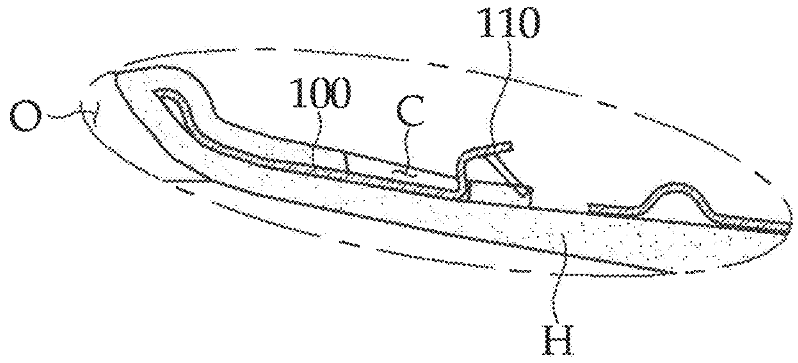

As shown in FIGS. 5 to 7, a sunroof bracket for a vehicle according to the present invention includes a bracket body 100 installed at an edge of an opening O formed in a headliner H to install a sunroof.

In particular, since a plurality of hooks 110 are formed on a surface facing a roof panel of the bracket body 100 when the bracket body 100 is mounted on the headliner H, and the hooks 110 are formed to allow fabric between a base and the fabric that constitute the headliner H wrapping the opening O to be forcibly caught thereon, it is possible to prevent the headliner H portion attached to the surface of the bracket body 100 from being peeled or separated, thereby improving the quality of the headliner.

In this case, since the hooks 110 are formed to be positioned on at least corner portions of the opening O to allow portions, which may be easily unfolded or peeled by being not folded due to folding or overlapping that occurs at corner portions when the headliner H is wrapped, to be fixedly caught thereon, it is possible to solve such a problem, thereby further improving the quality of the headliner H.

In addition, since the hook 110 is formed by cutting the surface of the bracket body 100 in a “C” shape and bending the cut portion twice in directions opposite to each other, it is possible to reinforce rigidity and stably and fixedly support the headliner H by allowing the headliner H to be easily caught on the hooks.

Hereinafter, such a configuration will be described in more detail with reference to the accompanying drawings as follows.

A. Bracket Body

As shown in FIGS. 5 to 7, the bracket body 100 is formed to be installed in close contact with edge portions of the opening O formed to pass through the headliner H to install a sunroof in the headliner H. Therefore, the bracket body 100 is formed in a closed curve shape that is the same as or similar to a shape of the opening O. In the drawings, an example in which the bracket body 100 has a rectangular shape and is formed in the shape of the opening O with the rounded corner portions is shown.

In particular, the bracket body 100 preferably is made of a metal material to reinforce rigidity, but may be made of a synthesis resin or the like with similar or better rigidity compared to the metal material. In addition, a plurality of installation holes are formed in the bracket body 100 to assembly clips and the like used when the headliner H is assembled to the roof panel.

Meanwhile, as shown in FIGS. 5 to 7, a plurality of hooks 110 are formed in the bracket body 100 formed as described above.

B. Hook

As shown in FIGS. 5 to 7, the hooks 110 are formed on the surface of the bracket body 100 facing the roof panel when the bracket body 100 is mounted at the edge portions of the opening O formed to pass through the headliner H, which face the roof panel.

In this case, as shown in FIG. 7, the hook 110 is formed to catch a locking hole C, which is formed in the headliner H portion wrapping both an inner surface of the opening O and the surface of the bracket body 100.

The reason is that, as the headliner H portion installed to wrap from the inner surface of the opening O to the surface of the bracket body 100 is caught on the hooks 110, the locking hole C of the headliner H is not detached or separated from the hooks 110 over time, and thus it is possible to prevent the headliner H portion wrapping the opening O from being peeled, detached, or separated from the wrapped portion.

In an exemplary embodiment of the present invention, as shown in FIGS. 5 to 7, at least one hook 110 is preferably formed at each location of the surface of the bracket body 100 that correspond to one of the corner portions of the opening O. The reason is that, since the hook 110 needs to be bent several times at the corner portions of the opening O for wrapping so that the corner portions of the opening O are wrapped by the headliner H, many overlapping portions occur, and thus the wrapped portions may be easily separated or detached by being easily unfolded unlike other portions. Therefore, as described above, by forming the hooks 110 on the easily separated or detached portions and fixing the headliner H portion, it is possible to prevent separation and detachment, thereby improving the quality of the headliner H.

Meanwhile, in the present invention, although the headliner H is described to be caught on a portion of the hooks 110, in general, since the headliner H is formed of the base and the fabric, it is preferable that the headliner H allow at least a fabric portion between the base and the fabric to be caught on the hook 110. The reason is that the thickness of the headliner H increases to allow both the base and the fabric to be caught on the hook 110, and the size of the hook 110 also needs to be increased correspondingly to allow the thick portion to be caught on the hook 110, and thus there is a concern that the portion to be caught is easily detached or separated from the hook 110 due to the thick portion.

In addition, as shown in FIGS. 5 to 7, since the hook 110 is formed by cutting the surface of the bracket body 100 in a "C" shape and then bending the cut portion twice in bending directions opposite to each other, it is possible to sufficiently secure the rigidity of the hook 110 and stably and fixedly support the headliner H.

As described above, according to the present invention, by forming the hooks on the sunroof bracket to allow the portions wrapping the opening to be fixedly caught thereon when perform the process of wrapping the opening formed in the headliner to mount the sunroof, it is possible to prevent the headliner from being easily detached or separated from the hooks, thereby improving the quality of the headliner. In this case, since the hooks are formed on at least portions facing the corner portions of the opening, the portion, which can be easily detached or separated due to overlapping or folding when the wrapping process is performed, to be fixedly caught thereon, and thus it is possible to prevent the headliner H from being easily detached or separated from the hooks.

A sunroof bracket for a vehicle according to the present invention has the following effects.

(1) By forming a headliner portion wrapping an opening formed in the headliner to be fixedly caught on hooks formed on a sunroof bracket installed at an edge of the opening, it is possible to prevent the headliner portion wrapping the opening from being easily peeled or separated, thereby preventing the quality degradation of the headliner.

(2) In particular, by forming the hooks on at least corner portions of the opening to allow the headliner portion wrapping the corner portions of the opening to be fixedly caught on the hooks, it is possible to prevent the headliner from being peeled or separated from the corner portions where the most folding or overlapping are generated.

(3) In addition, by forming the hooks by cutting a surface of the sunroof bracket in a "C" shape and then bending the cut portion twice in directions opposite to each other to allow the headliner to be easily caught on the hooks, it is possible to prevent the headliner from being easily detached or separated even after the wrapping process is finished.

(4) In this case, the hooks can be formed to allow the headliner generally formed of the base and fabric to be fixedly caught thereon, but formed to allow only the fabric between the base and the fabric to be caught thereon, and thus it is possible to easily and conveniently perform the wrapping process.

What is claimed is:

1. A sunroof bracket for a vehicle, comprising a bracket body installed at an edge of an opening formed in a headliner for sunroof installation, wherein a plurality of hooks, which are folded at corner portions of the opening to allow fabric between a base and the fabric of the headliner wrapping a surface of the backet body to be fixedly caught thereon, are formed on the surface of the bracket body facing a roof panel when the bracket body is mounted on the headliner, and wherein the hook is formed by cutting the surface of the bracket body in a "C" shape and bending a cut portion twice in directions opposite to each other.

2. The sunroof bracket of claim 1, wherein the hooks (110) are formed one-to-one on at least corner portions of the surface of the bracket body (100).

* * * * *